(12) United States Patent
Ouellet (10) Patent No.: US 9,174,338 B2
(45) Date of Patent: Nov. 3, 2015

(54) ROBOTIC MOVEMENT SYSTEM

(76) Inventor: Alexander G. Ouellet, Norwell, MA (US)

( * ) Notice: Subject to any disclaimer, the term of this patent is extended or adjusted under 35 U.S.C. 154(b) by 678 days.

(21) Appl. No.: 13/537,700

(22) Filed: Jun. 29, 2012

(65) Prior Publication Data

US 2013/0000438 A1     Jan. 3, 2013

Related U.S. Application Data

(60) Provisional application No. 61/502,627, filed on Jun. 29, 2011, provisional application No. 61/613,451, filed on Mar. 20, 2012.

(51) Int. Cl.
    *B25J 15/00*      (2006.01)
    *B25J 5/00*      (2006.01)
    *B25J 17/02*      (2006.01)

(52) U.S. Cl.
CPC .............. *B25J 5/007* (2013.01); *B25J 15/0009* (2013.01); *B25J 17/0275* (2013.01); *Y10T 74/20317* (2015.01)

(58) Field of Classification Search
CPC ............ A61F 2/604; A61F 2/54; A61F 2/58; A61F 2/583; A61F 2/585; A61F 2/586; A61F 2002/587; A61F 2002/5067; A61F 2002/507; A61F 2002/4698; A61F 2002/6863; A61F 2002/30079; B25J 5/007; B25J 15/0009; B25J 17/0275; Y10T 74/20317
USPC ....................... 180/20, 8.6, 7.1, 7.2; 310/90.5; 301/5.23; 384/145, 445
See application file for complete search history.

(56) References Cited

U.S. PATENT DOCUMENTS

| | | | | |
|---|---|---|---|---|
| 3,883,900 | A | * | 5/1975 | Jerard et al. ..................... 623/25 |
| 3,987,498 | A | * | 10/1976 | Mason ............................. 623/24 |
| 4,536,690 | A | * | 8/1985 | Belsterling et al. ........... 318/687 |
| 6,508,335 | B2 | * | 1/2003 | Zinanti ......................... 188/1.12 |
| 8,459,383 | B1 | * | 6/2013 | Burget ............................. 180/7.1 |
| 2005/0015030 | A1 | * | 1/2005 | Bousfield et al. ............. 601/113 |
| 2009/0222105 | A1 | * | 9/2009 | Clausen ........................... 623/27 |
| 2009/0299480 | A1 | * | 12/2009 | Gilbert et al. .............. 623/18.11 |
| 2010/0038960 | A1 | * | 2/2010 | Takenaka et al. ............. 305/133 |
| 2010/0096905 | A1 | * | 4/2010 | Takenaka et al. ............ 301/5.23 |
| 2010/0187779 | A1 | * | 7/2010 | Potter ......................... 280/5.514 |
| 2010/0243342 | A1 | * | 9/2010 | Wu et al. ......................... 180/7.1 |
| 2011/0231013 | A1 | * | 9/2011 | Smoot et al. .................. 700/245 |

(Continued)

FOREIGN PATENT DOCUMENTS

JP      2005342818 A   * 12/2005
JP      2005344777 A   * 12/2005

*Primary Examiner* — Ruth Ilan
*Assistant Examiner* — Darlene P Condra
(74) *Attorney, Agent, or Firm* — Modern Times Legal; Robert J. Sayre (57) ABSTRACT

A robotic movement system includes at least one orb-based transmission assembly that includes an orb mount structure to or in which a magnet is mounted. At least one motor and a plurality of rollers are also mounted to the orb mount structure. The rollers contact an orb, which is rotated via rotation of the rollers for displacement and rotation of the robotic platform. The orb also includes a magnet having a magnetic attraction to the magnet mounted to the orb mount structure to hold the orb in contact with the rollers. In exemplary embodiments, the robotic movement system can function as a navigation and displacement mechanism for a displaceable robotic system or as a robotic joint for robots or for living beings.

14 Claims, 7 Drawing Sheets

(56) References Cited

U.S. PATENT DOCUMENTS

| | | | |
|---|---|---|---|
| 2011/0260523 A1* | 10/2011 | Takenaka et al. | 301/5.23 |
| 2012/0018232 A1* | 1/2012 | Uehara | 180/7.1 |
| 2012/0032496 A1* | 2/2012 | Takenaka et al. | 301/5.23 |
| 2012/0086262 A1* | 4/2012 | Makino | 301/5.23 |
| 2013/0140801 A1* | 6/2013 | Schlee et al. | 280/762 |
| 2013/0261766 A1* | 10/2013 | Langlois et al. | 623/33 |
| 2014/0088717 A1* | 3/2014 | Boyden et al. | 623/19.11 |
| 2014/0257496 A1* | 9/2014 | Boyden et al. | 623/19.11 |

* cited by examiner

ROBOTIC MOVEMENT SYSTEM

RELATED APPLICATION

This application claims the benefit of U.S. Provisional Application No. 61/502,627, filed 29 Jun. 2011, and of U.S. Provisional Application No. 61/613,451, filed 20 Mar. 2012, the entire content of each of which is incorporated herein by reference.

BACKGROUND

Drive systems have remained primarily centered around the same simple concepts for many years, typically relying on some sort of rotary power output, such as a car engine or electric motor, wherein the rotary drive power, in turn, is converted into linear motion of the entire system. These existing drive systems can be easily separated amongst the following different and distinct types of motion.

A first type of drive system is a tank drive. This type of drive train maneuvers by changing the speed of either side of the system, allowing a robot to drive forward and backward and also to turn. By speeding up or slowing down rotation on one side relative to the other, the robot is able to turn; and a small difference in the displacement of opposite sides is magnified causing the difference in displacement (or speed) to rotate the entire robot. A downside of this approach is that, at high speeds, a minor difference in rotation can lead to large directional changes, and this often is impractical at high speeds.

A second type of drive system uses Ackerman steering/articulation. These drive trains work by mechanically altering the orientation of one set of wheels, usually forward wheels, so that the direction of motion is turned along that new orientation. Typically, in these systems, only either the rear wheels or the front wheels are powered, much like in a car. Although more controllable at high speeds, robots employing Ackerman steering/articulation are much less maneuverable, and tend to have delayed or choppy turning—depending on how the steering is implemented.

A third type of drive system uses omni-wheels (i.e., omni-directional wheels) and Mecanum drive. Robots that employ this system typically use tank drive associated with unique sets of wheels. These wheels are either omni or Mecanum wheels—the common characteristic being that they have rollers mounted in the wheel set either perpendicular to the direction of overall rotation (omni) or at a 45 degree angle to it (Mecanum). These wheels work by generating a vector quantity. When normally driving, the robot behaves as any other tank-drive robot, but when driving the wheels against each other, a vector is generated which causes atypical movement. For example, when running Mecanum wheels towards each other the North-South force cancels causing the robot to move directly east or west, as if sliding. Omni wheels function in a similar way, but with perpendicular rollers. A disadvantage to these approaches is that the vector force drastically reduces power; and, due to the rollers, robots employing these systems can slide easily when outside forces act on them or when they attempt to change direction.

A fourth type of system is swerve drive, which tends to be the most difficult drive train to implement. Swerve drive works by independently rotating the entire orientation of each wheel. Additionally, each wheel is independently powered, meaning that the entire motor assembly, gearing, wheel and mounting are all rotated carefully and precisely so that neither mechanical nor electrical components are damaged. The end effect is that the robot is able to move in any direction, but that there is a delay in change of direction; moreover, a large number of safety procedures typically are needed to prevent the robot from damaging itself. Physically, these requirements and characteristics typically make swerve robots heavy, slow, and difficult to build.

SUMMARY

A new robotic drive and joint system and methods for their operation are described herein. Various embodiments of the apparatus and methods may include some or all of the elements, features and steps described below.

A robotic movement system, described herein, includes an orb mount structure, a magnet mounted to or in the orb mount structure, a plurality of rollers mounted to the orb mount structure at different orientations, at least one motor coupled with at least two of the rollers to selectively rotate the coupled rollers, and an orb in contact with the rollers and rotatable via rotation of the rollers, the orb further including a magnet having a magnetic attraction to the magnet mounted to or in the orb mount structure.

In particular embodiments, one or more orb-based transmission assemblies are mounted to a robotic platform to provide a robotic drive system for displacing the robotic platform. In other embodiments, where the robotic movement system functions as a robotic joint, an appendage is mounted to the orb to provide for pivotable rotation of the appendage about the orb as the orb is rotated.

In operation, power is distributed from the motor to rotate at least one of the rollers, and rotation of the roller is used to rotate the orb in contact with the roller; and the distribution of power from the motor to the rollers is changed to change the rotation imparted to the orb.

Embodiments of the robotic drive system can offer significant improvements over previous systems in terms of both maneuverability and efficiency. At peak performance—due to the effect of the rollers—the robot is able to convert 71% of the motor output to motion. The conversion efficiency of other omni-directional drive systems can be as low as 25% and can suffer the added disadvantage of being easily affected by outside forces. In contrast, the drive system described herein can maintain both power and maneuverability, while not being particularly vulnerable to outside forces.

In terms of maneuverability, the drive system can instantly change its motion to any direction at a whim but is also able to move in arcs, zigzag patterns, and many other patterns that are unachievable with other drive systems. This enhanced maneuverability can allow the system to carry out unique tasks that may be unachievable with existing robots. This high degree of maneuverability is advantageous for any task that must be completed in tight spaces, such as in urban areas, and also is more efficient in the industrial setting, where the system can simply rotate in place for movement rather than having to make unnecessary moves. This maneuverability can accordingly greatly increase productivity in environments, such as warehouses where robots must literally navigate a maze of closely packed boxes and crates, wherein robots can be equipped with the robotic drive system of this disclosure to enable the maneuverability desired in that setting. In the medical field, this technology can be applied to wheelchairs to make them far more convenient and navigable in crowded areas where the ability to maneuver can be greatly hampered; in this context, the chair portion of the wheelchair can be mounted on the robotic drive system of this disclosure, and a person can ride on and direct the motion of the wheelchair via motorized control of the rollers. This system also is applicable to electric vehicles, wherein the robotic drive system can replace the wheels, transmission and frame of a conventional vehicle in which a human can ride and which the human can likewise direct. Given how inefficient current cars are and in view of increased environmental awareness along with rising energy prices, this technology can be applied to create more-efficient and more-maneuverable cars, personal transporters, and even children's toys. In other applications, a computer numerical control (CNC) machine tool, including, e.g., a router or a 3D print head, or a milling machine can be mounted on a robotic drive system, which can dynamically reposition the tool while a product is being fabricated, cut or otherwise re-shaped.

Advantageous aspects of the drive system can include, but are not limited to, the following. First, the system can have a relatively simple design and include relatively few parts given the complexity of the resultant motion, especially compared to other robot drive systems. Second, the system can operate with a great amount of efficiency at 71%, which is far better than other omni-directional drive systems. Third, the system can provide enhanced maneuverability, unmatched by any known drive system, while also maintaining traction and power. By providing simple, flexible, responsive and reliable mobility, the system can be advantageously utilized, for example, in autonomous navigation and mobility for emergency, rescue and security responses, in areas inaccessible by humans or where humans may be at risk. Because the system can be provided at relatively low cost, it also offers an affordable mobility solution for the mass market, including consumer use and is suitable for use, for example, in home, hospital and public environments. Further, the system can be used in space exploration, providing mobility for lunar and planetary exploration.

In other embodiments, the system is incorporated into an artificial ball-joint system for pivoting limbs or other body parts of, e.g., humans, animals or robots or for pivoting a wide variety of other components (e.g., to pivot solar panels on a mount across multiple degrees of freedom to track the sun's movement). The joint system can be used in artificial limbs or as a replacement for damaged or degraded human joints (e.g., as an artificial knee, ankle, toe, shoulder, elbow, wrist, or finger joint). In these embodiments, the artificial joint may provide even greater freedom of motion than the natural joint it replaced. Like the robotic drive system described above, the robotic pivot system uses magnetic bearing joints in a series and is powered via rollers in contact with the ball joint.

This joint system can offer a variety of advantages, including those listed above, in contexts, including robotic manipulation and in medical (surgical) procedures for limb and/or joint replacement, and is likewise relatively simple and can be provided at relatively low cost in view of the sophistication of its operation and the wide freedom of movement it affords.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

LIST OF PARTS AND ASSOCIATED REFERENCE NUMBERS 10 robotic platform
11 transmission assembly
12 cover plate
14 base plate
16 orb 18 magnet
20 roller
22 motor
24 spacer peg
32 motor-control modules
34 digital sidecar
36 main controller
38 battery
40 power distribution board
42 circuit breaker
44 sprocket
45 belt
46 motor mount frame
48 orb mount structure
50 orb bearing
52 rotary drive shaft
54 bushing
56 roller shaft
58 wireless bridge/access point
60 stationary bearing magnet
62 concave cavity
64 robotic joint system
66 joint at shoulder
68 joint at elbow
70 joint at wrist
72 joint at fingers
74 ball bearings
75 bearing groove
76 hand
77 appendage line
78 rotary motor for appendage
79 appendage
80 grooves
82 spindle Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

As noted, above, the rotary orb-based systems described herein can be incorporated into, e.g., robotic drive or joint systems, each of which is discussed, in turn, below.

Figure 1:
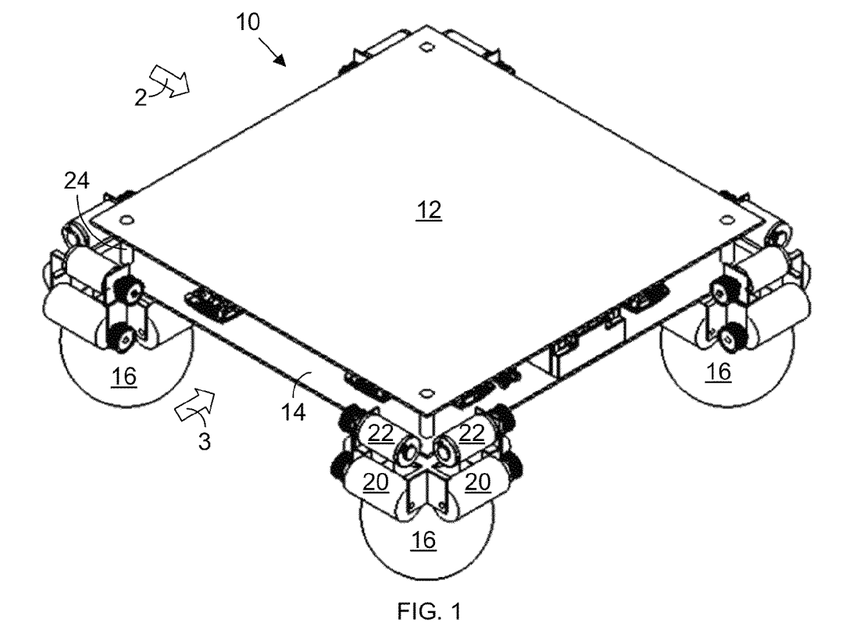
FIG. 1 is a perspective view of a robotic drive platform with four magnetized and roller-displaced orbs for motion and maneuverability.
Figure 2:
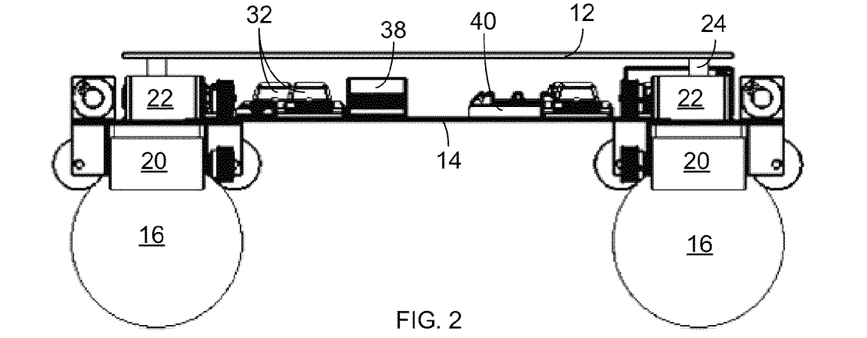
FIG. 2 is a side view of the robotic drive platform of FIG. 1, taken from the perspective of arrow 2 in FIG. 1.
Figure 3:
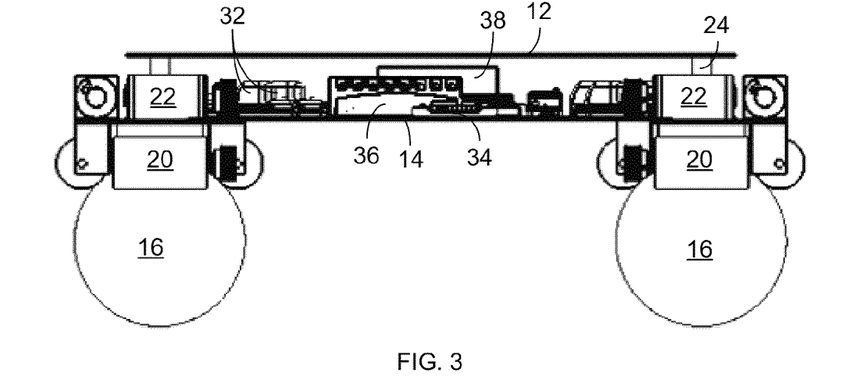
FIG. 3 is a side view of the robotic drive platform of FIG. 1, taken from the perspective of arrow 3 in FIG. 1.

Robotic Drive System:

The basis of the robotic drive system centers on omni-directional movement. An embodiment of a robotic platform 10 incorporating the robotic drive system is shown in FIGS. 1-3. The system includes at least one (in this case, four) orb-based transmission assembly 11, a magnified view of which is provided in FIGS. 6-10 and with various components of the assembly 11 shown in isolation in FIGS. 11-16. The robotic platform 10 may have as few as one or as many as ten or more orb-based transmission assemblies 11 mounted thereto; though, for the center of rotation and maneuverability to work out advantageously, one orb-based transmission assembly 11 can be placed at or proximate each vertex of the robotic platform 10. Where reference is made herein to one component being "mounted" on or to another components, the components can be distinct structures or they can be different parts of a single integral structure without there necessarily being a clear boundary or differentiation between components.

Figure 4:
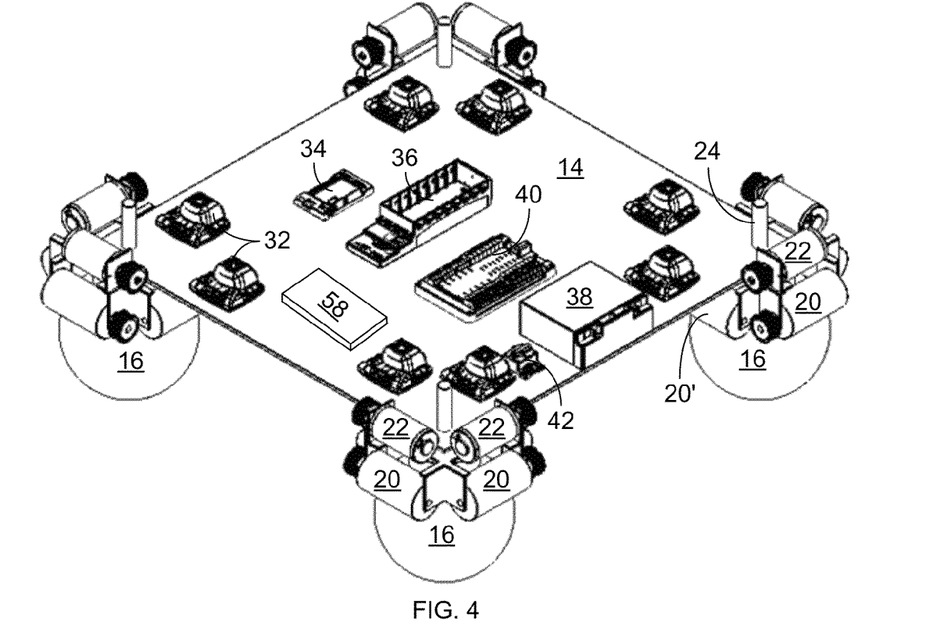
FIG. 4 is a perspective view of the robotic drive platform of FIG. 1 with the top cover plate removed.
Figure 5:
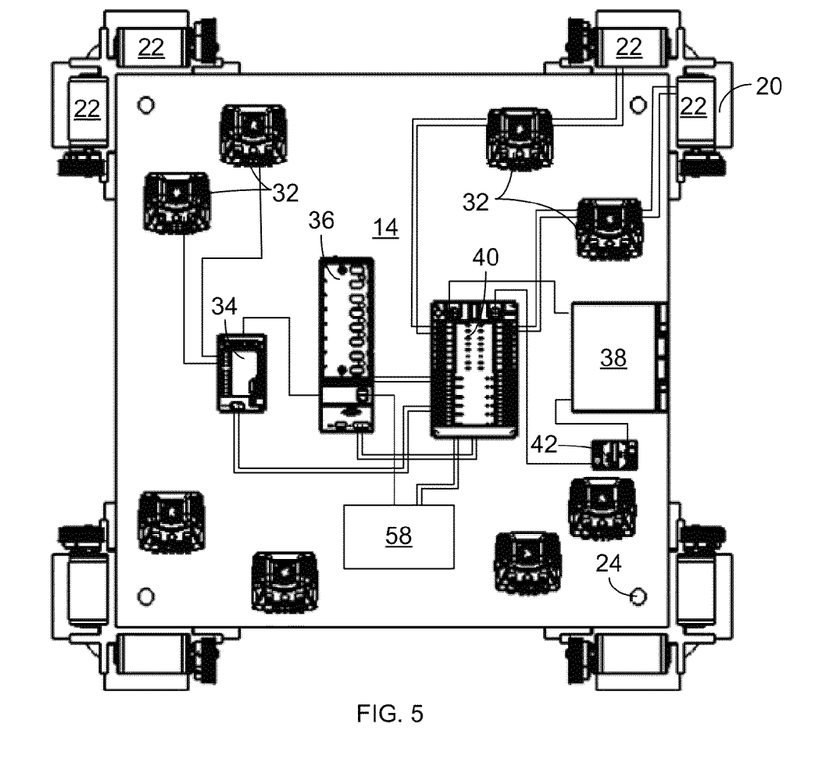
FIG. 5 is a top view of the robotic drive platform of FIG. 1 with the top cover plate removed.
Figure 6:
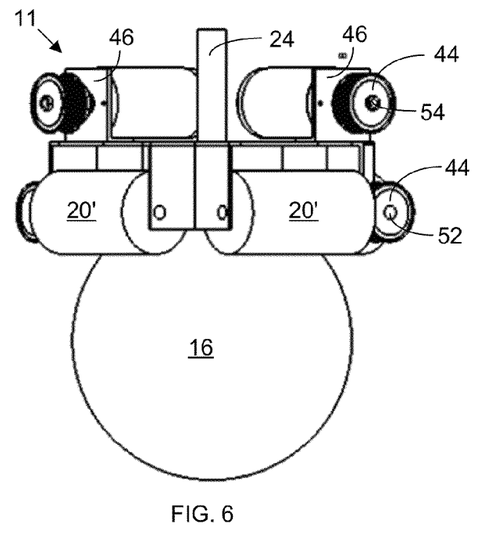
FIG. 6 is a side view of one of the four orb-based transmission assemblies, including an orb, associated rollers, motors and a frame, from the system of FIG. 1.
Figure 7:
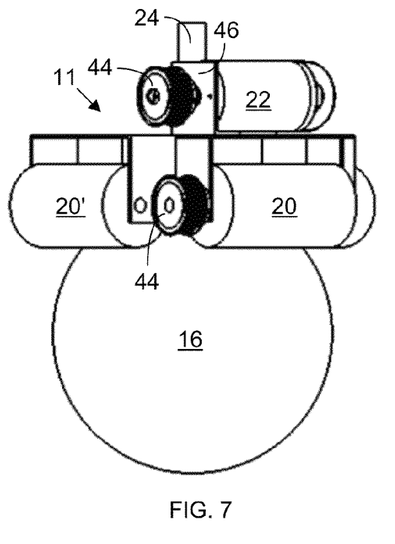
FIG. 7 is a side view of the orb-based transmission assembly of FIG. 6 rotated 90° clockwise (looking down) about the vertical axis.
Figure 8:
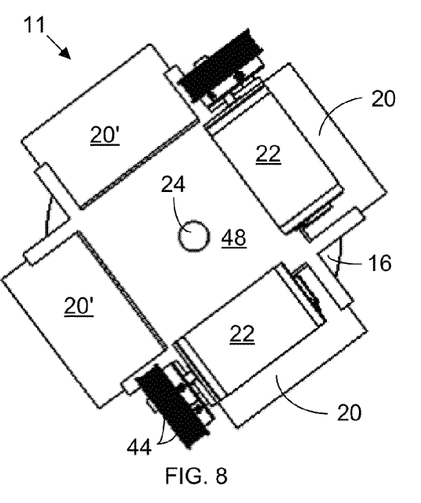
FIG. 8 is a top view of the orb-based transmission assembly from FIG. 7.
Figure 9:
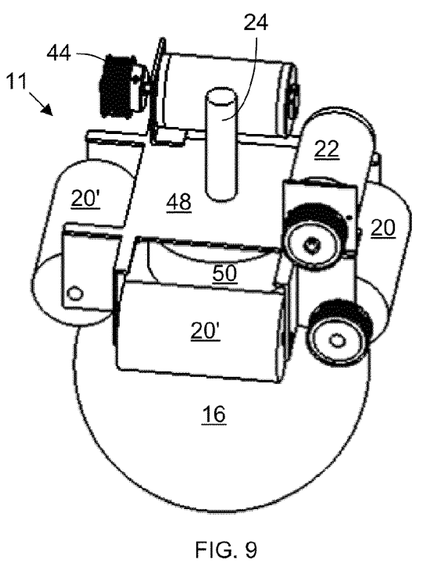
FIG. 9 is a perspective view of the orb-based transmission assembly from FIG. 7.
Figure 10:
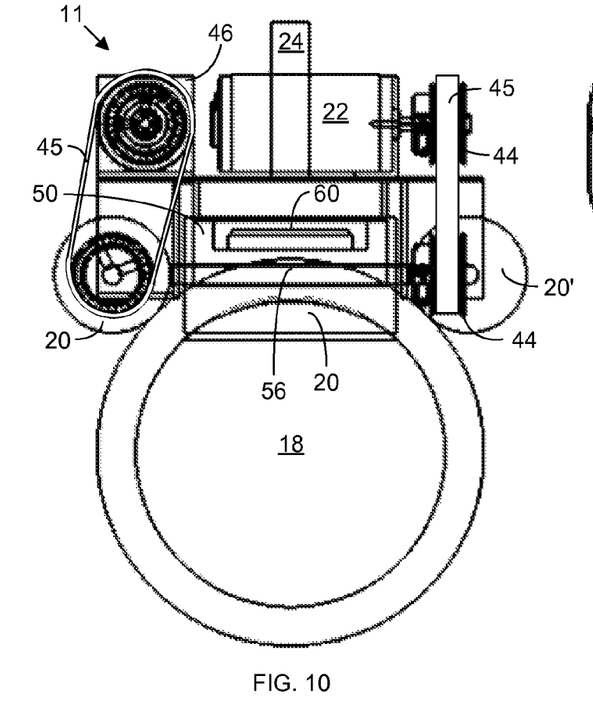
FIG. 10 is a partially transparent sectional view of the orb-based transmission assembly from the preceding figures.
Figure 11:
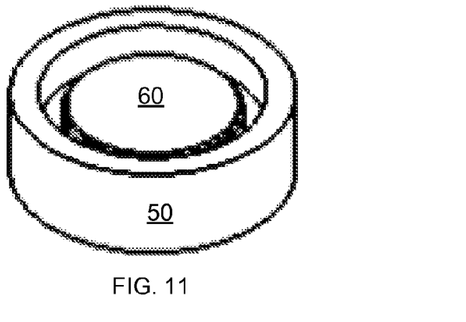
FIG. 11 is a top perspective of the orb bearing and bearing magnet, which are suspended beneath the orb mount structure and directly above, in contact with and magnetically coupled with the orb.
Figure 12:
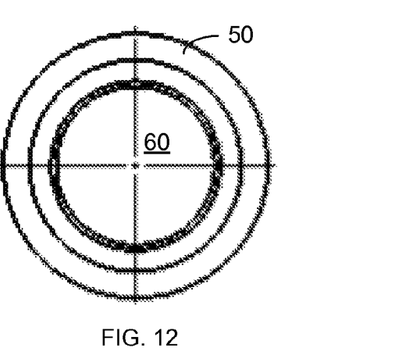
FIG. 12 is a top view of the orb bearing and bearing magnet of FIG. 11.
Figure 13:
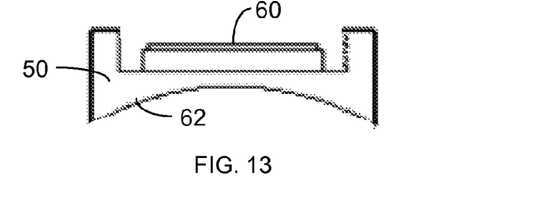
FIG. 13 is a sectional side view of the orb bearing and bearing magnet of FIG. 11.
Figure 14:
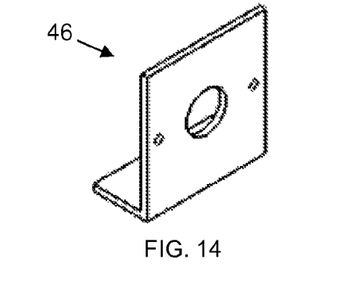
FIG. 14 is a perspective view of one of the motor mounting plates from the platform of FIG. 1.
Figure 15:
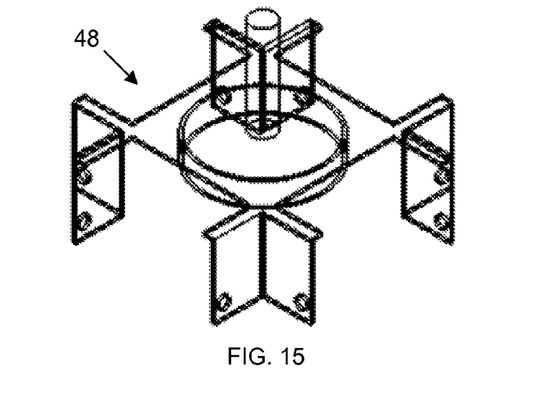
FIG. 15 is a perspective view of the orb mount frame shown in FIGS. 8 and 9.
Figure 16:
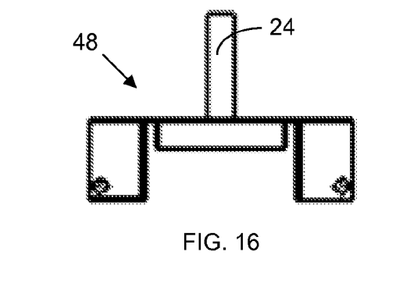
FIG. 16 is a side view of the orb mount frame of FIGS. 8, 9 and 15.

The robotic platform 10 is controlled using a computing device, such as a computer (e.g., a laptop computer) in communication with the following components on the platform 10: a controller 36, a battery 38, a power distribution board 40, a circuit breaker 42, a digital sidecar 34, and motor-control modules 32. These components can be seen in FIGS. 4 and 5, which shows the robotic platform 10 with the cover plate 12, which is supported on a spacer peg 24 in FIGS. 1-3, removed. The controller 36 can be a CompactRIO (CRIO) reconfigurable embedded control and acquisition system (controller) (available from National Instruments). The motor-control modules 32 can be a Jaguar Stellaris brushed DC motor-control module, available from Texas Instruments.

The various components on the robotic platform can be electrically interconnected on the robotic platform 10 via conductive pathways formed, e.g., of copper. Some of the conductive pathways are schematically shown via lines between components for distributing power and control signals, respectively, from the power distribution board 40 and from the main controller 36 and digital sidecar 34. For ease of illustration and to avoid excessive clutter, not all of the pathways are illustrated (e.g., representations of the power-distribution and control-signal lines to the motor-control modules 32 and motors 22 are illustrated for at least one pair of motors 22 and control modules 32, though similar conductive pathways to each of the other pairs of motors 22 and control modules 32, while present in this embodiment, are omitted from the illustration).

The computer [with a computer processor coupled with input and output devices (e.g., a keyboard and monitor), a communication device (e.g., a wireless card), and a computer-readable medium (e.g., a hard drive) storing non-transitory software code] is used both to program the robot for autonomous operation, and also for tele-operated control via a human driver. The controller 36 on the robotic platform 10 is programmed by loading operational code from the computer to the controller 36, and then wirelessly communicating from the computer driver station to the controller 36 via, e.g., wi-fi communication through a wireless router (and optionally over the internet), e.g., using a communication module 58, such as an XBee-PRO 802.15.4 RF module, available from Digi International Inc. or a wireless bridge, such as a DAP-1522 XTREME N DUO wireless bridge/access point, available from D-Link. Alternatively, a similar communication device/method, such as a personal area network or a GSM mobile communication network via a communications satellite, can be used to provide wireless communication to and from the device. The communication module 58 is electronically coupled with the controller 36 to communicate the driving instructions received from the computer via wireless communication to the controller 36. Alternatively, the controller 36 can be directly coupled with a computer, though mobility may be limited with a physical (wired) communication link.

The digital sidecar 34 is available, for example, as model am-0266 from AndyMark, Inc. and is in electronic communication with the controller 36 and with the I/O devices, such as the motor-control modules 32, in the system for controlling the flow of instructions and/or data therebetween. Each of the motor-control modules 32, in turn, is configured to transmit instructions for operation to a respective motor 22, which can be, for example, a motor sold as model number FR801-001 by CCL Industrial Motors, and to receive data from on-board sensors (e.g., potentiometers, gyroscopes, and cameras) used to operate the robot. The motor 22 is mounted on a motor mount frame 46, and a sprocket 44 is mounted on its drive shaft 52 with a bushing 54.

The battery 38 can be a 12-volt sealed lead acid battery with nut-bolt connector, commercially available as an Enersys Genesys NP18-12 battery or as an MK ES17-12 battery, available, e.g., from AndyMark, Inc. The battery 38 is electrically coupled with a power distribution board 40 for distributing the power supply from the battery 38 to other system components and with a circuit breaker 42 to protect the system from a voltage overload or short circuit.

The orb-based drive transmission assemblies 11, which are shown in FIGS. 6-10, include several parts that, together, create a rigid frame around the moving orb 16. The framework for the orb-based drive transmission assembly 11 is the orb mount structure (plate) 48 and orb bearing 50. The orb mount structure 48 can be a machined part, made of metal, plastic, or other suitable material, that can either be molded if formed of polymer, or machined using a mill and by bending and breaking if formed of metal. This orb mount structure 48 serves as the mounting surface for all the hardware and machinery for the transmission. The orb mount structure 48 also serves as the connection between the orb 16, motors 22, transmissions, and rollers 20 to the base plate 14. The orb mount structure 48 is connected to the orb bearing 50 at its bottom surface. The orb bearing 50 is a cylindrical piece of polymer with a concave cavity 62 (see FIG. 13) in the bottom, which can be spherical in shape so as to closely fit the outer surface of the orb 16.

In this embodiment, the orb bearing 50 is designed to hold the orb 16 in place and to reduce friction by creating a smooth bearing surface. The orb bearing 50 holds the orb 16 in place by use of a large, cylindrical stationary bearing magnet 60 in its housing. This magnet 60 is attracted to a paired magnet 18 inside the hollow orb 16 so that while that free magnet 18 in the orb 16 and the stationary bearing magnet 60 are exerting attractive forces on each other, the orb 16 is restrained from sliding free of the robot. Each of the magnets 18 and 60 can be either a permanent magnet or magnetizable in the presence of an external magnetic field and can be in the form of, e.g., ferromagnets or rare-earth magnets, such as a neodynium magnet.

Figure 17:
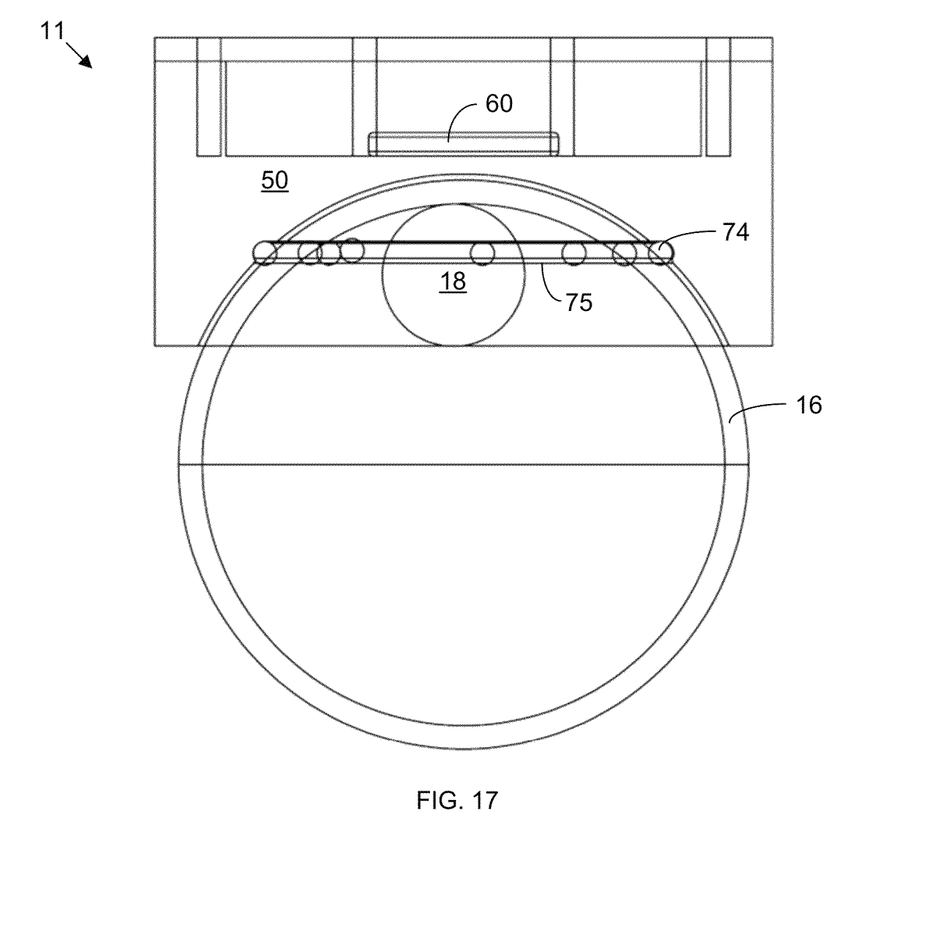
FIG. 17 is an illustration of a partially transparent sectional view of an alternative embodiment of the orb-based transmission assembly.

In the embodiment of the orb-based drive transmission assembly 11 shown in FIG. 17, a groove 75 is defined in the concave surface of the orb bearing 50; and small ball bearings 74 are nested inside that groove 75 so that the orb 16 dynamically contacts and rotates on the ball bearings 75 rather than on the static concave surface of the orb bearing 50, thereby potentially reducing friction between the orb 16 and orb bearing 50. In this embodiment, the magnet 18 nested inside the orb 16 is smaller than the hollow volume defined by the walls of the orb 16. Accordingly, the orb magnet 18 can roll and spin inside the orb 16.

The orb 16, itself, can be made of, for example, carbon fiber, a polymer/plastic or metal, depending on the application. The orb 16 can be, e.g., 10 inches in diameter; though by adjusting the scale of the robot components, the size of the orb 16 can be modified for different applications. These orbs 16 are the basis for the robot's motion and are moved by powered rollers 20 attached to the orb mount structure 48 via a V belt 45 from Gates Corporation (shown in FIG. 10) mounted on sprockets 44. The rollers 20 can be formed of, for example, a rubber, polymer, plastic, or silicon base, such as those made by American Roller; and the rollers 20 can be mounted on brackets extending down from the orb mount structure 48 at 90 degrees to each other, allowing for an infinite number of directional shifts by use of their generating vector forces. By adjusting the orientation of these rollers 20 relative to the intended front of the robot for its projected use, one can adjust its power efficiency in a given use, because certain arrangements favor power in certain directions, with a peak efficiency of about 71%. The fastest and most powerful direction of motion is in the direction of the opening of "V" shape provided by the powered rollers 20; thus, if the robotic platform 10 has a system that should be forward facing or a certain task requiring speed or power, the end of the robot intended for that use can advantageously have the "V" opening of the powered rollers 20 angled towards it due to the vector effects of the rollers 20.

The rotary shafts 52 of the motors 22 drive rotation of the rollers 20 via the V belt 45 from Gates Corporation. The V belt 45 is a high-strength rubber transmission belt of customizable length, and it is attached to sprockets 44 with teeth in them on both the rollers 20 and the motors 22. The belt 45 works using friction and tension on the teeth much like a chain does. These belts 45 in turn then transmit the rotary force from the motors 22 to the rollers 20; and the rotation of the rollers 20 is transmitted to the orb 16, which rotates as the rollers roll against it. In other embodiments, a single motor 22 can be coupled with a plurality of rollers 20 and configured to selectively discriminate the rotation provided to different rollers 20, e.g., using either servos or pneumatics, with three stages of shifting.

In the embodiment shown in FIGS. 6-10, each orb-based transmission assembly 11 includes four rollers 20/20'. Two of the rollers 20 are powered by respective motors 22 and belts 45, while the other two rollers 20' are passive, providing balanced support of the orb-based transmission assembly 11 on the orb 16 and rotating with the orb 16 but not driving the rotation of the orb 16.

The orb-based transmission assemblies 11 can move the robotic platform 10 in any direction and can also rotate the robotic platform 10 relative to its own center of movement. These movements and rotation can be achieved by varying the power output of the motors 22 to the rollers 20 and in turn to the orbs 16. By causing the forces to either add up or cancel out as a vector, the orbs 16 are able to rotate in any direction simply by adjusting the relative output of each motor 22. The orb 16 generates movement by rolling against a surface (e.g., a floor) against which the orb 16 rests, e.g., via gravity. When potentiometers are attached to both the output shafts of the motors 22, and the roller shafts 56 of each transmission, the main controller 36 (e.g., a CompactRIO controller) is able to translate these readings into robot velocity. The controller 36, in turn, can then regulate these outputs in order to control the overall movement of the robotic platform 10.

Just as the two powered rollers 20 create vector movement of the orb 16, the orbs 16 will collectively create a vector on the robot's motion. By regulating the individual rollers 20, as well as by using a gyroscope to sense overall robot rotation and movement, the human controller or autonomous computer controlling the robot is able to make very precise changes to robot orientation and velocity, something that other drive systems greatly lack. By using a gyroscope or other orientation-based sensor, the robot is also able to lock onto a point and move relative to that point, while never changing the robot's actual orientation relative to the point. For example, the robot can point its front face at a central point and drive in a circle around the point, with the front face always pointed directly at the point and never shifting focus.

Operation of the motors 22 in the orb-based transmission assemblies 11 to generate displacement and rotation of the robotic platform 10 can be governed by computer software instructions non-transitorily stored on a computer readable medium in the controller 36 coupled with a computer processor for execution of those instructions and configured for communication with the motors 22 and sensors in the system, wherein the processor can generate instructions for particular motors 22 when executing the software code, and those instructions can be transmitted via the digital sidecar to the selected motors 22 to generate the rotation in the orbs 16 that will produce the desired movement or rotation of the robotic platform 10. The software instructions stored on the computer-readable medium of the controller 36 can be generated by a user using, e.g., the LabVIEW programming tool provided by National Instruments when the controller is a CompactRIO controller.

Robotic Joint System:

The robotic joint system, shown in FIGS. 18-24, can use the various components, described above, and operate via the same or similar mechanics, as described above for the robotic drive system.

Figure 18:
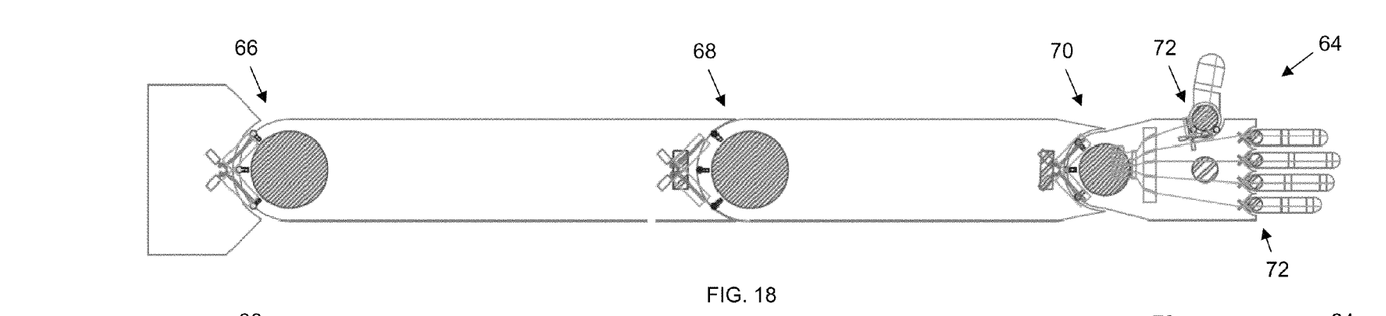
FIG. 18 is a sectional view of a robotic joint system including orb-based joint assemblies in an artificial arm.
Figure 19:
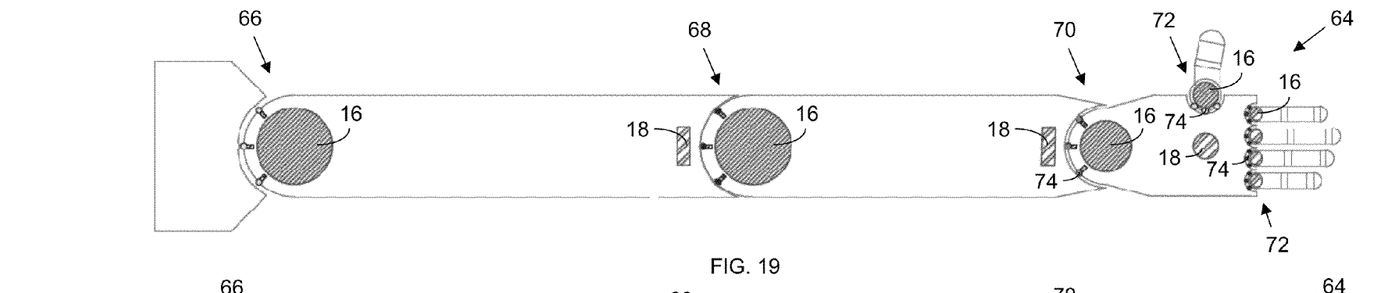
FIG. 19 is an isolated sectional view of the orbs, magnets and ball bearings in the artificial arm of FIG. 18.
Figure 20:
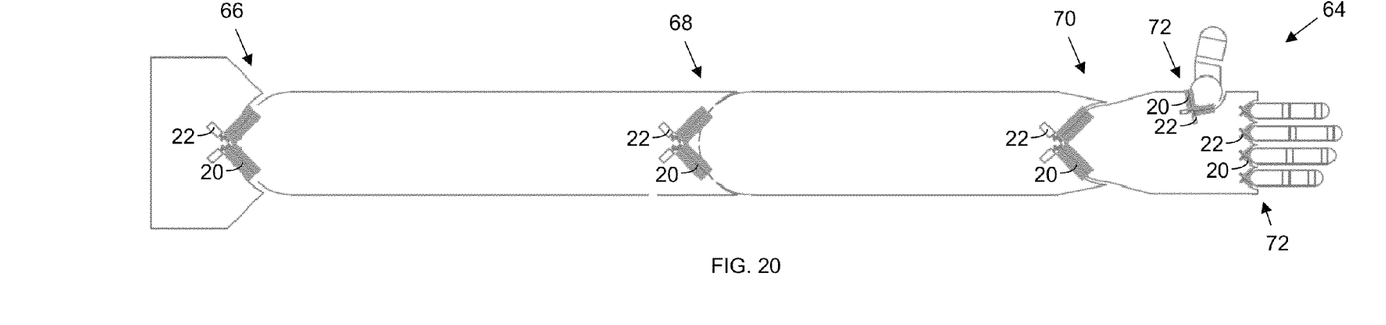
FIG. 20 is an isolated sectional view of the rollers and motors for spinning the orbs in the artificial arm of FIG. 18.

An example of a robotic joint system 64 with artificial joints at the shoulder 66, elbow 68, wrist 70 and fingers 72 is shown in FIGS. 18-20, where FIG. 18 shows the full system, while FIG. 19 provides an isolated view of the orb 16, magnet 18, and bearing 74 assemblies, and FIG. 20 provides an isolated view of the roller 20 and motor 22 assemblies. As shown in FIG. 19, each joint includes a rotatable orb 16 incorporated into one body part (e.g., a hand) and mounted on another body part (e.g., a forearm—serving as the orb mount structure) via ball bearings 74. Accordingly, the body part into which the orb 16 is incorporated will pivot and/or spin about and in concert with the orb. In this embodiment, each body part is artificial and can be formed, e.g., of molded plastic. Rollers 20 driven by motors 22, as shown in FIG. 20, rotate to spin (pivot) the orb 16 relative to the adjoining body part with the magnet 18 for holding the orb 16 in the joint socket. If the magnetic pull of the magnets 18 on the orbs 16 is insufficient to ensure that the limb segments do not detach, the entire limb can be covered in a high-strength, flexible fabric.

Figure 21:
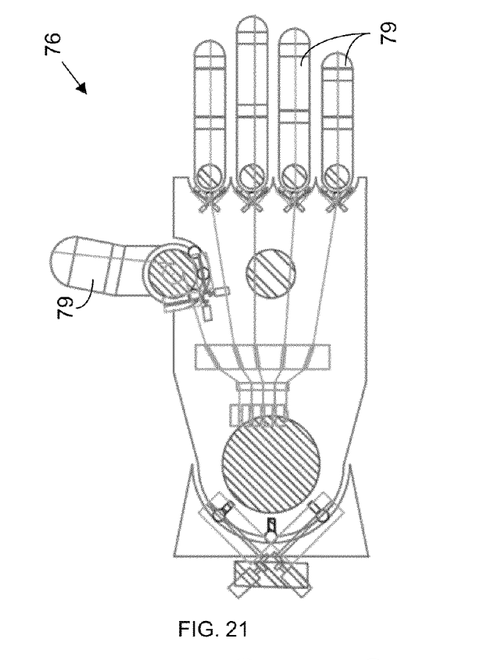
FIG. 21 is a sectional view of the hand of the artificial arm of FIG. 18.
Figure 22:
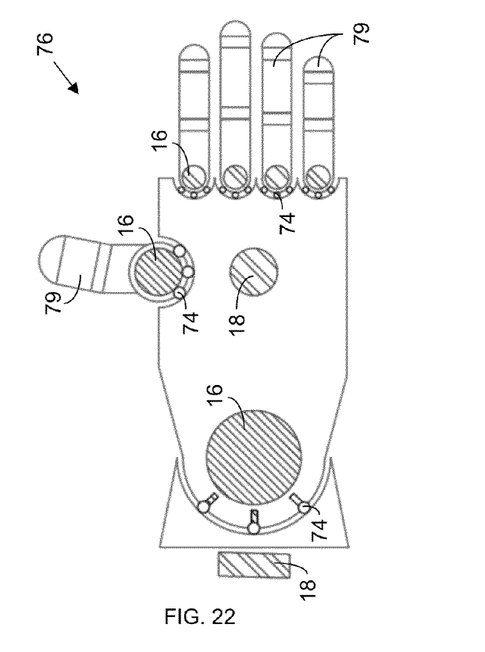
FIG. 22 is an isolated sectional view of the orbs, magnets and ball bearings in the hand of FIG. 21.
Figure 23:
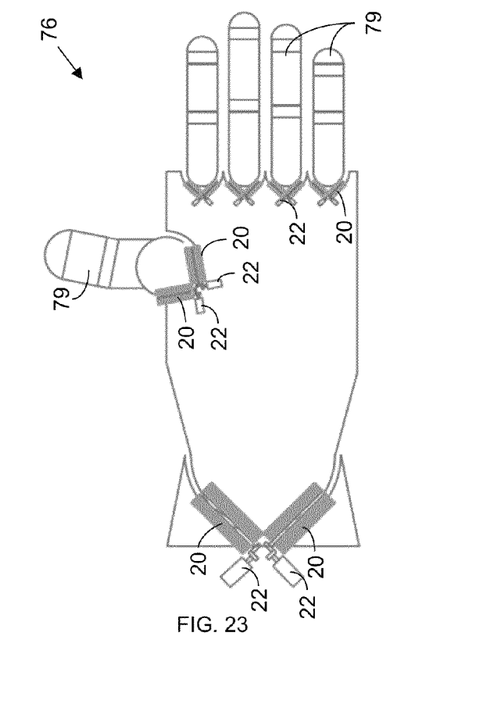
FIG. 23 is an isolated sectional view of the rollers and motors for spinning the orbs in the hand of FIG. 21.
Figure 24:
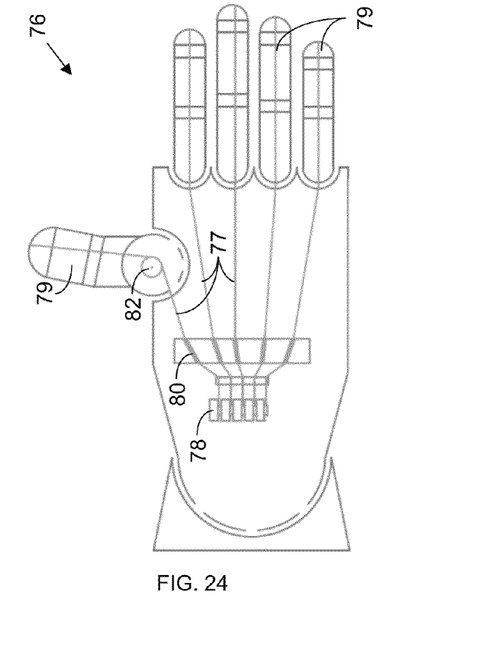
FIG. 24 is an isolated sectional view of the pulley system for curling and uncurling the fingers in the hand of FIG. 21.

Magnified views of the hand 76 from the robotic joint system 64 of FIGS. 18-20 are provided in FIGS. 21-24. FIG. 21 shows the full system. Meanwhile, FIG. 22 provides an isolated view of the orb 16, magnet 18, and bearing 74 assemblies. Furthermore, FIG. 23 provides an isolated view of the roller 20 and motor 22 assemblies. Finally, FIG. 24 provides an isolated view of the pulley system, which includes separate lines (e.g., cables) 77, each attached to the end of a distinct appendage (finger) 79 and to a rotary motor 78 that retracts or extends the line 77 about its shaft depending on direction of rotation. Various grooves 80 and spindles 82 maintain the positioning of each line 77. As each line 77 is retracted, the appendage 79 to which it is coupled either curls or extends, depending on whether the line 77 extends over or under the appendage 79. In a reverse motion, the appendage 79 extends or curls when the line 77 is released.

The motors 22 and 78 can be powered and controlled via wires coupled with a controller and power source or via wirelessly linked motor-speed controllers where each segment is not physically linked by wires. Essentially, each arm segment can have a wireless receiver, a self-contained processor and a speed controller, which can be controlled by a central wireless network and computer system.

Wireless magnetic induction can be used to power the motors 22 and 78 for each segment. The magnetic induction is provided by using the magnets inherent to each joint system as components of the magnetic induction system. Essentially, power can be wirelessly transmitted through each joint to power the motors, processors, and other systems from one segment to another.

These joints and limbs are not just for prosthetic use, as they can be used on many different systems, ranging from small robots, such as spider robots, to industrial systems, such as production-line robots. These systems can also be used in full-scale robotic applications, such as humanoid robotics.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A robotic movement system, comprising:
    an orb mount structure;
    a magnet mounted to or in the orb mount structure;
    a plurality of rollers mounted to the orb mount structure at different orientations;
    at least one motor coupled with at least two of the rollers to selectively rotate the coupled rollers;
    an orb in contact with the rollers and rotatable via rotation of the rollers, the orb further including a magnet having a magnetic attraction to the magnet mounted to or in the orb mount structure; and
    an appendage mounted to the orb for pivotable rotation about the orb as the orb is rotated such that the orb serves as a joint.

2. The robotic movement system of claim 1, wherein at least one of the rollers coupled with the motor(s) is oriented to contact the orb at an angle orthogonal to an angle at which another of the rollers contacts the orb to generate rotation of the orb along respective orthogonal axes and vector rotation via combinations of rotation of the rollers.

3. The robotic movement system of claim 1, further comprising a robotic platform to which the orb mount structure is mounted.

4. The robotic movement system of claim 3, wherein at least three sets of (a) rollers and (b) respective orb in contact with the rollers are mounted to the robotic platform.

5. The robotic movement system of claim 4, further comprising:
    an electronic controller mounted on the robotic platform and in electronic communication with the motor(s); and
    a battery electrically coupled with the electronic controller and with the motor(s) to power operation of the motor(s).

6. The robotic movement system of claim 1, wherein the motor(s) and the rollers coupled with the motor(s) include sprockets for rotating the rollers, the system further comprising belts that couple the roller sprockets with the motor sprockets.

7. The robotic movement system of claim 1, wherein the orb mount structure defines a concave cavity in contact with the orb.

8. An artificial joint system comprising;
    a pivotable segment including an orb and an appendage mounted to the orb for pivotal rotation of the appendage about the orb as the orb is rotated;
    a mounting segment in which the pivotable segment is pivotably mounted;
    a plurality of rollers extending from the mounting segment at different orientations; and
    at least one motor coupled with at least two of the rollers to selectively rotate rollers.

9. The artificial joint system of claim 8, wherein the mounting segment and the pivotable segment each includes a magnetic material, wherein a magnetic attraction is formed between the magnetic material of the mounting segment and the magnetic material of the pivotable segment.

10. The artificial joint system of claim 8, further comprising ball bearings between the pivotable segment and the mounting segment to facilitate rotation of the pivotable segment relative to the mounting segment.

11. The artificial joint system of claim 8, further comprising a pulley system including respective lines coupled to a plurality of appendages extending from the pivotable segment and coupled in series to facilitate curling and uncurling of the appendages.

12. The artificial joint system of claim 11, wherein the artificial joint system forms an artificial limb.

13. A method for generating robotic movement using a system comprising an orb mount structure, a magnet mounted to or in the orb mount structure, a plurality of rollers mounted to the orb mount structure at different orientations, and at least one motor coupled with at least two of the rollers to selectively rotate the coupled rollers, and an orb in contact with the rollers and rotatable via rotation of the rollers, wherein the orb includes a magnet having a magnetic attraction to the magnet mounted to or in the orb mount structure, and wherein an appendage is mounted to the orb, the method comprising:
    distributing power from the motor to rotate at least one of the rollers;
    using the rotating roller to rotate the orb;
    changing the distribution of power from the motor to the rollers to change the rotation imparted to the orb; and
    pivoting the appendage via the rotation of the orb.

14. The method of claim 13, wherein the orb is rotated against a surface, the method further comprising displacing the system relative to the surface via the rotation of the orb against the surface.

* * * * *